United States Patent [19]

Blum

[11] 4,410,009
[45] Oct. 18, 1983

[54] RECOVERABLE SLEEVE ASSEMBLY

[75] Inventor: John M. Blum, San Jose, Calif.

[73] Assignee: Sigmaform Corporation, Santa Clara, Calif.

[21] Appl. No.: 388,676

[22] Filed: Jun. 15, 1982

Related U.S. Application Data

[63] Continuation of Ser. No. 133,801, Mar. 25, 1980, abandoned.

[51] Int. Cl.$^3$ ............................ F16L 9/00; F16L 55/00
[52] U.S. Cl. ........................................ 138/109; 138/99;
138/141; 138/178; 138/103; 174/DIG. 8;
428/36
[58] Field of Search ................... 174/DIG. 8; 138/99,
138/103, 109, 141, 178; 428/36

[56] References Cited

U.S. PATENT DOCUMENTS

| | | | |
|---|---|---|---|
| 2,725,621 | 12/1955 | Gates | 174/DIG. 8 |
| 3,243,211 | 3/1966 | Wetmore | 174/DIG. 8 |
| 3,515,798 | 6/1970 | Sievert | 174/DIG. 8 |
| 3,770,876 | 11/1973 | Post | 174/88 R |
| 3,824,331 | 7/1974 | Mixon, Jr. et al. | 174/84 R |
| 4,035,534 | 7/1977 | Nyberg | 428/36 |
| 4,070,746 | 1/1978 | Evans et al. | 174/DIG. 8 |
| 4,135,553 | 1/1979 | Evans et al. | 174/DIG. 8 |
| 4,179,320 | 12/1979 | Midgley et al. | 174/DIG. 8 |
| 4,338,970 | 7/1982 | Krackeler et al. | 174/DIG. 8 |

FOREIGN PATENT DOCUMENTS 2018527 10/1979 United Kingdom .
1556677 11/1979 United Kingdom .

OTHER PUBLICATIONS

Bonk, "Polyurethane", Modern Plastics Encyclopedia 1975–1976, pp. 84–85.

Primary Examiner—William R. Dixon, Jr.
Attorney, Agent, or Firm—Limbach, Limbach & Sutton

[57] ABSTRACT

A recoverable sleeve assembly is disclosed having an inner elastomeric tube and an outer rigid tube surrounding and secured to the inner tube holding the inner tube in outwardly stretched condition and wherein the outer tube extends axially beyond and covering at least one end of the inner tube and secured to that end of the inner tube. The end of the outer tube extending beyond the end of the inner tube has a thickness equal to the total thickness of the inner tube plus the thickness of that portion of the outer tube that surrounds the inner tube. The outer tube is a rigid thermosetting adhesive polyurethane comprising a polyester polyol reacted with an isocyanate whereby the outer tube is sufficiently adhesive to hold the inner tube in outwardly stretched condition but will peel from the inner tube upon impact of force or application of heat without need for a solvent. The polyester polyol is disclosed as trimethylol propane branched glycol adipate polyol or polycaprolactone polyol modified with 1,4 butanediol reacted with the isocyanate. The sleeve is applied around a substrate, and the outer tube is fractured by impact of force to allow the inner tube to shrink and the fragments of the outer tube to peel from the inner tube.

8 Claims, 18 Drawing Figures

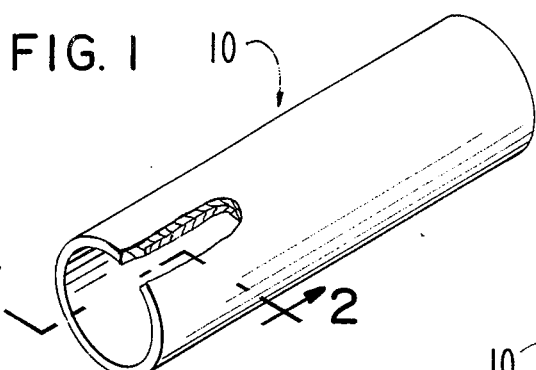
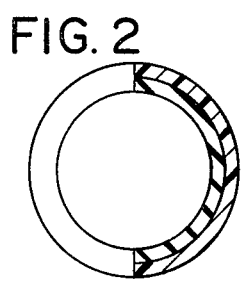
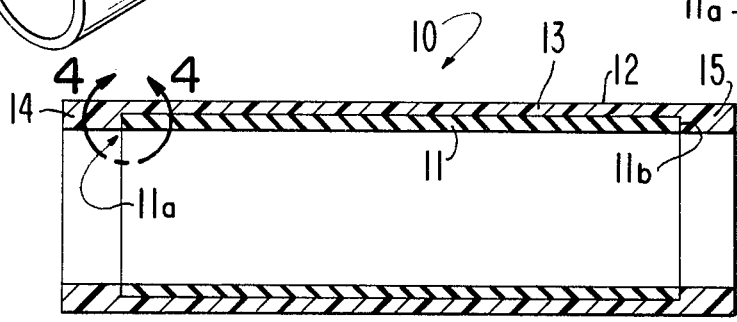
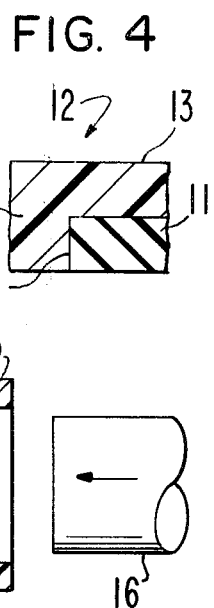
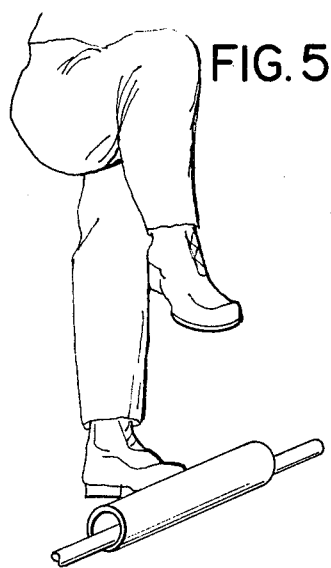
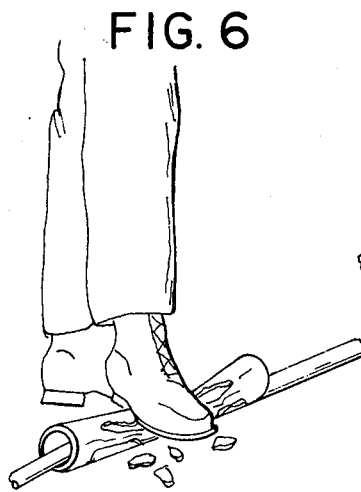
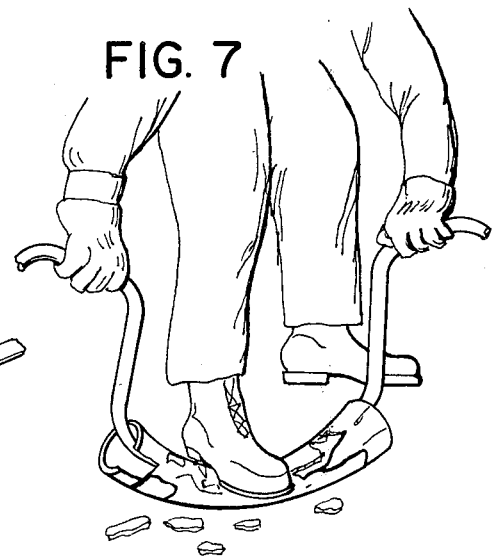
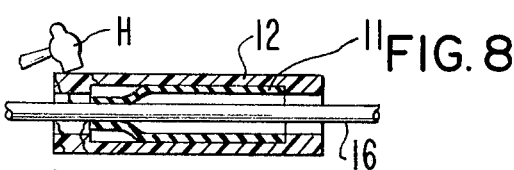
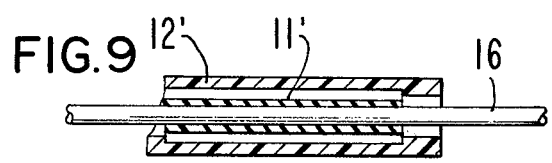
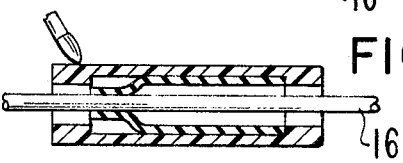
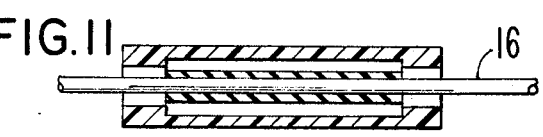
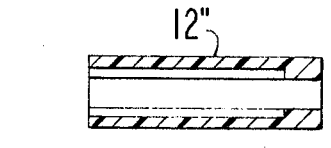
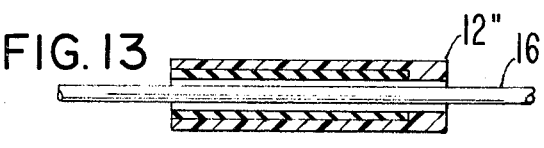

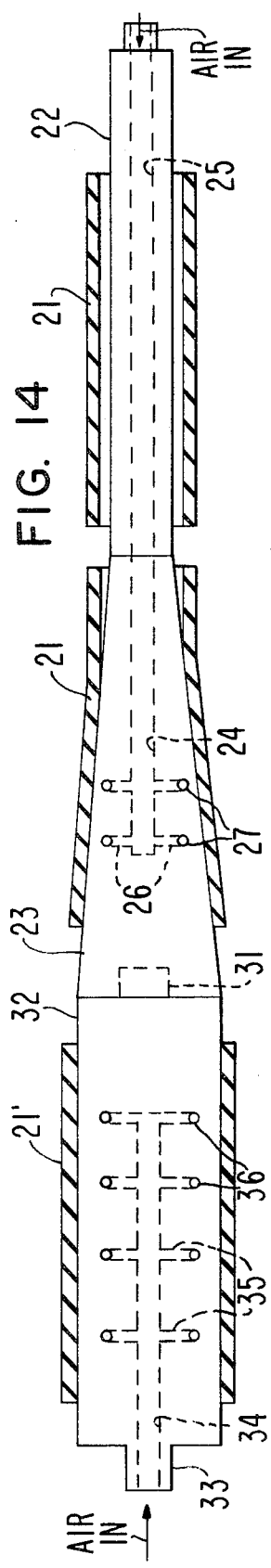
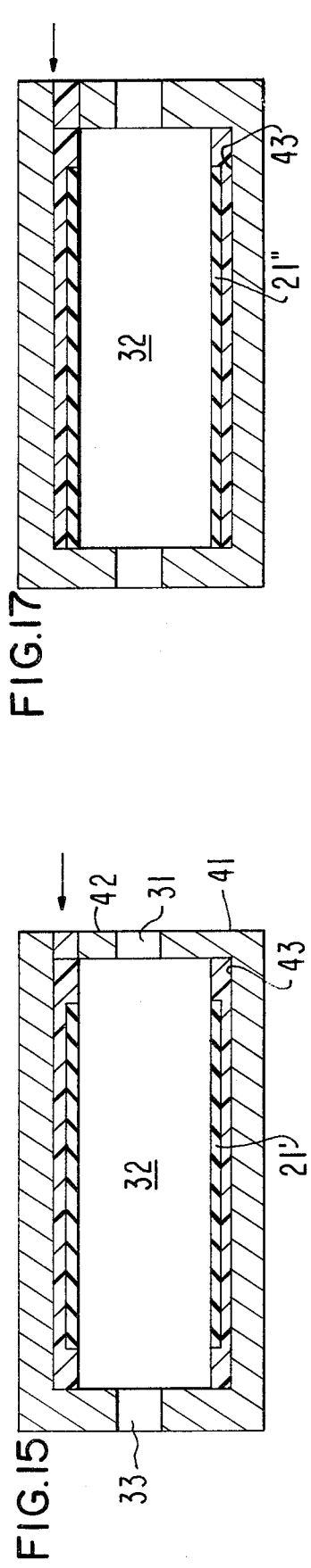
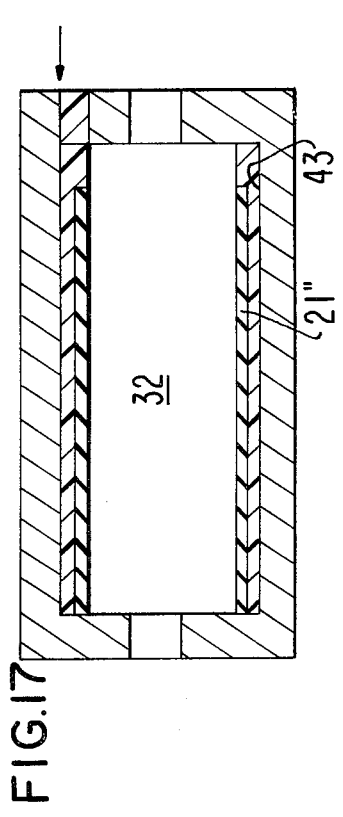
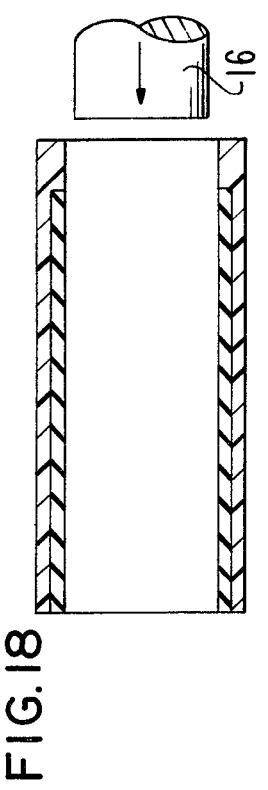
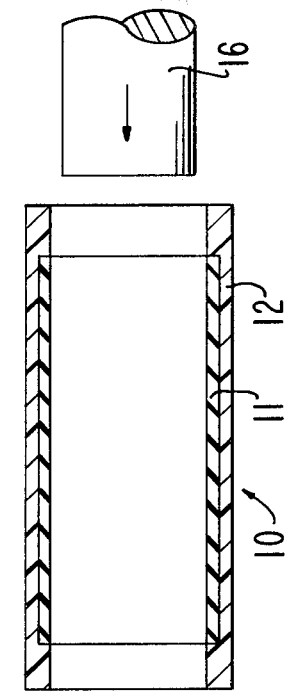

RECOVERABLE SLEEVE ASSEMBLY

This application is a continuation of Ser. No. 133,801, filed Mar. 25, 1980 now abandoned.

The present invention is directed to a recoverable sleeve assembly that can be applied without heat or a solvent. Heat shrinkable sleeves with or without internally coated sealant have found wide utility for insulating conductors in a splice. A major disadvantage is the necessity of a heat source to accomplish the recovery. The heat source may be an open flame or hot air gun, both of which provide a hazard in an atmosphere where combustible gas may exist such as in a coal mine or manhole.

U.S. Pat. No. 4,035,534, to Nyberg discloses a heat shrinkable member formed around and held by adhesive or coupling agent to an elastomeric material. The heat shrinkable member is disclosed as a heat recoverable thermoplastic material having sufficient rigidity at storage temperatures to hold the elastomeric material in the desired stretched position. U.S. Pat. No. 3,243,211 to Wetmore discloses a sleeve assembly comprising a rigid fusible tubular member surrounding a recoverable tubular member and holding the recoverable member in expanded condition under tension. The fusable member is described as virtually any material capable of being rendered flowable by the application of heat such as thermoplastic materials as well as thermosetting materials.

A number of methods for recovering an elastomeric sleeve without the use of heat have been proposed and some of these are in actual use. Articles and methods employing both internal support members and external support members have been designed. Methods with internal support members are disclosed in U.S. Pat. Nos. 2,725,621 to Gates and 3,515,798 to Sievert. The Gates patent discloses the use of a sleeve of frangible material holding an elastic sleeve or tube in stretched condition so that an impact to the assembly disintergrates the inner sleeve allowing the elastomeric portion to collapse and shrink. The Sievert patent discloses an elastic cover with an internal support core which can be removed by spirally unwinding; such an article is in wide spread use. Internal support techniques have two major disadvantages. No sealant or adhesive can be applied to the inner surface to aid in bonding the shrinkable member to a substrate such as a cable, and the internal support is often difficult to remove over an irregular substrate.

Several shrinkable elastomeric tubes have been designed with external support means. U.S. Pat. No. 3,770,876 to Post discloses external means provided to pre-stretch the elastomeric tube at the time of installation. U.S. Pat. No. 3,824,331 to Mixon et al discloses an elastic tubular member rolled back on itself in storage condition on an external support member and unrolled at the time of use. This construction restricts the elastic member to a thin wall rubber sleeve thus reducing the abrasive resistance of the resultant cover. U.S. Pat. No. 4,070,746 to Evans et al discloses an external rigid restraint bonded to the outer surface of an elastomeric member with the bond susceptible to attack by solvents to allow the elastomeric sleeve to peel away from the outer member upon the application of the solvent. British Pat. No. 1,556,677 discloses a recoverable article including the features of the Evans et al patent but also disclosing provision for an outer restraining member capable of being segmented or broken by shattering. A typical restraining means is disclosed as a thermoplastic such as polyvinyl chloride. U.S. Pat. No. 4,179,320 to Midgley discloses a recoverable article having an elastomeric member held in stretched condition by a flexible outer restraining means provided with score lines.

The present invention provides a recoverable sleeve assembly wherein an inner elastomeric tube is held in expanded condition by a rigid thermosetting polyurethane outer tube which is secured to a pre-stretched elastomeric inner tube. The recoverable sleeve assembly combines the two essential features of rigidity and optimum peel strength in a single unit. The outer supporting tube can be removed at the time of recovery without the use of any solvent to break the adhesive bond. The outer tube is a rigid thermosetting polyurethane adhesive made from a polyol reacted with an isocyanate in a formulation to provide a degree of adhesion which has sufficient adhesive strength in tension to hold the inner tube stretched but is weak enough in peel to allow the rigid sleeve to be removed after breaking by impact or application of heat without the use of a solvent.

The preferred thermosetting adhesive is a polyester polyol formed from a mixture of trimethylol propane branched glycol adipate polyol or polycaprolactone polyol modified with 1, 4 butanediol reacted with the isocyanate.

In accordance with another aspect of the present invention the outer tube extends axially beyond and covers at least one end of the inner tube and is secured to the end of the inner tube. In a preferred embodiment the outer tube has a thickness equal to the total thickness of the inner tube plus the thickness of that portion of the outer tube which surrounds the inner tube and preferably the outer tube extends axially beyond and covers and is secured to both ends of the inner tube.

Other features and advantages of the present invention will become more apparent upon perusal of the following specification taken in conjunction with the accompanying drawings wherein similar characters of reference refer to similar elements in each of the several views.

DESCRIPTION OF THE DRAWINGS

FIG. 1 is a perspective view partially broken away of one recoverable sleeve in accordance with the present invention.

FIG. 2 is a elevational view, partially in section, of a portion of the structure shown in FIG. 1 taken along line 2—2 in the direction of the arrows.

FIG. 3 is a elevational sectional view of a recoverable sleeve assembly in accordance with the present invention for insertion over a substrate.

FIG. 4 is an enlarged sectional view of that portion of the structure shown in FIG. 3 delineated by the line 4—4.

FIGS. 5, 6 and 7 illustrate one manner in which the recoverable sleeve is utilized in practice.

FIGS. 8 and 9, 10 and 11, and 12 and 13 illustrate other manners of use of the present invention.

FIG. 14 is a side elevational view, partially in section, schematically illustrating certain of the steps in forming a recoverable sleeve in accordance with the present invention.

FIG. 15 is an elevational sectional view of a molding step utilized in forming the recoverable sleeve assembly in accordance with the present invention.

FIG. 16 illustrates a recoverable sleeve assembly formed in accordance with the molding step illustrated in FIG. 15.

FIGS. 17 and 18 are figures similar to FIGS. 15 and 16 illustrated in another embodiment of the present invention.

DESCRIPTION OF PREFERRED EMBODIMENT

Referring now to the drawing with particular reference to FIGS. 1-3, there is illustrated a preferred embodiment of the recoverable sleeve assembly in accordance with the present invention. The sleeve assembly 10 includes an inner elastomeric tube 11 in outwardly stretched condition and an outer rigid tube member 12 surrounding and secured to the inner tube 11 and holding the inner tube in its outwardly stretched condition. The outer tube 12 includes a central portion 13 surrounding and secured to the outer surface of the inner tube 10 and two end portions 14 and 15 extending axially beyond the ends 11a and 11b of the inner tube and secured to the ends 11a and 11b of the inner tube. The end portions 14 and 15 have a thickness equal to the total thickness of the inner tube plus the thickness of the central portion 13 of the outer tube which surrounds the inner tube 11.

The end portions 14 and 15 serve several different purposes. They provide a strong support ring at the end of the assembly which is thicker and stronger in the radial direction than the central portion 13 of the outer tube. They cover and are secured to the end of the inner tube 11 preventing access to the interface between the outside surface of the tubular member 11 and the central portion 13 of the outer member where peeling apart of the inner and outer tubular members 11 and 12 begins. Additionally they serve to shield the interface between the inner and outer tubular members 11 and 12 at the end of the tubular member 11 from engagement by the end of a substrate 16 such as cable onto which the recoverable sleeve is telescopically moved such as for covering a splice or the like. Contact between the substrate 16 and either the interface or the end of the inner tube 11 can cause the tubes 11 and 12 to begin to peel apart.

The inner tubular member is preferably a rubber elastomeric sleeve. The major property requirement of the elastomeric sleeve or tube 11 is that it must have low permanent set when stretched such as approximately 100 to 150% radially. This is required since in the end product the elastomeric tube 11 will be held in expanded condition for extended period of time during storage. A preferred material for the inner tube 11 is a neoprene rubber formulation which has necessary recovery properties with flame retardance, particularly suitable for splicing coal mining cable. Typical mechanical properties for this formulation are tensile strength of 1800 psi, elongation of 400% and 100% modulus of 430 psi.

The preferred outer tube 12 is a rigid thermosetting adhesive comprising a polyurethane formed of a mixture of a polyol preferably polyester polyol such as TMP (trimethylol propane) branched glycol adipate or polycaprolactone polyol modified with 1, 4 butanediol reacted with an isocyanate. The trimethylol propane branched glycol adipate preferred is a hydroxyl terminated polyester in the molecular weight range of 1000–2000 which can be prepared from dibasic acids such as adipic and sebacic reacted with an excess glycol (ethyleneglycol or diethylene glycol) or polyhydric alcohol such as glycerol or trimethylol propane. Reaction with a slight excess of glycol insures that the polyester will be hydroxyl terminated. These hydroxyl groups are available to participate in the urethane reaction. A preferred formulation is as follows:

| FORMULATION I |
|---|
| Parts |
| 81 TMP branched glycol adipate (FORMREZ 102 Witco Chemical) |
| 15 1, 4 butanediol (BASF) |
| 3 Phenylmercuric propionate catalyst (METASOL 57, (Merck) |
| 1 antioxidant (Flectol H Monsanto) |
| 1 release (Int —20E, Axel Plastics) |

101 parts of the above polyester polyol were reacted with 115 parts of a polymeric isocyanate such as Rubinate-M by Rubicon Chemicals to produce a composition having a tensile modulus of 363,000 psi. Other isocyanates such as PAPI 135 by Upjohn and MONDUR MR by Mobay Chemicals can be used.

The polymeric isocyanates or diisocyanates when reacted with the polyol in the presence of a catalyst react rapidly to form a polyurethane. The ratio of the isocyanate to the polyol mixture should be in the range of 1.05 to 1.10 equivants of isocyanate per equivalent weight of polyol. A unique feature of the polyurethanes used in this invention is that they can be mixed in a high intensity mixing head and injected into a mold while still liquid and within a few minutes cure to a solid thermoset resin.

Other formulations can be based on polycaprolactone polyols modified with 1, 4 butanediol and reacted with an isocyanate. The exact modulus of the outer shell is difficult to define since the ability to hold the rubber sleeve expanded without collapsing is a function both of the modulus and the thickness of the outer shell. For example, both of the following polyol formulations reacted with isocyanate (PAPI 135 by Upjohn), will function in this invention.

| FORMULATION II |
|---|
| Parts |
| 65 polycaprolactone polyol (NIAX polyol PCP 0300, Union Carbide) |
| 20 polycaprolactone polyol (NIAX polyol PCP 0200, Union Carbide) |
| 15 1, 4 butanediol (BASF) |

100 parts of the above polyol were reacted with 100 parts of PAPI 135 to produce a composition having a tensile modulus of 210,000 psi.

| FORMULATION III |
|---|
| Parts |
| 85 polycaprolactone polyol (NIAX polyol PCP 0300, Union Carbide) |
| 15 1, 4 butanediol (BASF) |

100 parts of this formulation reacted with 115 parts of PAPI 135 produced a composition having a tensile modulus of 317,000 psi.

Obviously Formulation III can be used in a thinner cross-section to resist the collapsing force of an expanded rubber tube. However, all formulations are effective.

In the present invention a thickness of 0.040-0.130 inch is preferred for the outer member for an unexpanded neoprene rubber inner tube 0.140 inches thick and ID of 0.85 inches which is then stretched to an ID of 1.85 inches.

Other polyols which may be substituted for the polyols in the above formulations to produce the rigid outer tube of the sleeve assembly are polyester polyols such as and poly neopentyl adipate and polyether polyols such as polyethylene glycol, polypropylene glycol, alithatic hydroxy terminated polyester and polypropylene derivitives of propylene glycol, trimethylolpropane or sucrose.

A typical application of the recoverable sleeve assembly 10 is illustrated in FIGS. 5, 6 and 7. The recoverable sleeve assembly 19 is placed on the substrate 16 and rested on a flat surface. By stamping on the recoverable sleeve assembly 10 and allowing the assembly to set for 30 second the inner tube 11 will break free of the fragments of the outer tube 12 and shrink around the substrate 16. The outer shell fragments are peeled away. Flexing of the splice as illustrated in FIG. 17 will help to remove the fragments of the outer tube in an area where the inner tube has not been completely released.

Other techniques of utilization are illustrated in FIGS. 8-13. In FIGS. 8 and 9 utilization of the recoverable sleeve assembly 10 is illustrated by first fracturing such as with hammer H at only one end of the assembly 10 whereby the inner tube 11 begins to peel away from the outer tube 12 and then peels away successively longitudinally of the two members. The remainder of the outer tube 12' can then be removed by fracturing at the location or elsewhere after movement longitudinally of the substrate 16.

The present invention can be utilized without heat, but FIGS. 10 and 11 illustrate that heat can be applied to the assembly 10 adjacent the joinder of the end of the inner tube 11 to the end portions of the outer tube 12. The bond between the inner tube 11 and outer tube 12 will be weakened and the end of the inner tube 11 will release and shrink peeling away successively longitudinally from the outer tube 12. The outer tube 12 can then be removed such as in the manner described with reference to FIGS. 8 and 9.

FIGS. 12 and 13 illustrate an alternative embodiment of the present invention wherein the outer tube 12" extends axially beyond and covers only one end of the inner tube 11. In this embodiment when the substrate 16 is inserted into the assembly through the end where the outer tube projects beyond the inner tube, the extending end portion of the outer tube 12" protects engagement of the substrate with the end of the inner tube that could cause the inner tube to begin to peel away from the outer tube.

The polyurethane shell can be molded in a relatively short cycle. Referring now to FIGS. 14-16 there is illustrated a preferred molding operation. In FIG. 14 the inner tube 21 is unexpanded condition is provided over the outside of a first, hollow cylindrical, small diameter mandrel 22 one end of which is connected to an air supply and the other end of which is fitted into the small diameter end of a tapered mandrel 23. Tapered mandrel 23 is provided with a central bore 24 which communicates with the central bore 25 of mandrel 22. Passageways 26 extend from the tapered mandrel central bore 24 to the outside surface thereof terminating in ports 27. The large diameter end of the mandrel 23 fits on a small diameter cylindrical end extension 31 of a matching large diameter mandrel 32. The other end of the large diameter mandrel 32 is provided with a similar cylindrical end extension 33 which is connected to an airsource for passing air through a central axial bore 34 and radial passages 35 to ports 36 in the exterior surface of the mandrel 32. The elastomeric tube 21 is slid longitudinally from the small mandrel 22 over the tapered mandrel 23 onto the outside surface of large diameter mandrel 32 whose diameter is equal to the desired expanded diameter of the inner tube 11 of the recoverable sleeve assembly.

Mandrel 32 is disconnected from the air supply and from tapered mandrel 23 and with the stretched rubber sleeve 21' acts as the central core in a mold illustrated in FIG. 15. The mold consists of lower and upper halves 41 and 42 each of which have semi-cylindrical cavities which when the parts are assembled provide a hollow cylindrical cavity having a diameter equal to the desired out side diameter of the outer tube 12 of the assembly. The mold halves 41 and 42 contain semi-cylindrical recesses for receiving the small diameter cylindrical and extensions 31 and 33 of the mandrel 32. The mandrel 32 with the attached elastomeric tube 21' is placed in the lower half 41 of the mold and the mold closed and the above mentioned polyol/isocyanate mixture injected into the mold around the central core. The clearance between the outside surface of the elastomeric tube 21' of the central core and the mold cavity is the wall thickness of the outer tube 12 that surrounds the inner tube 11. It is noted that the cavity 43 of the mold is the full length of the mandrel 32 whereas the expanded elastomeric sleeve is of lesser length and spaced from the ends of the cavity 43. The material forming the outer tube will fill the space between the ends of the expanded tube 21 and the ends of the mold cavity 43. The mold is heated to accelerate the cure of the urethane. After about 10 to 15 minutes the mold is opened and the core removed. After post-cure, the composite rubber sleeve and polyurethane outer shell are blown off the mandrel 32 by pressuring the inside of the mandrel.

Prior to insertion of the mandrel 23 and expanded tube 21' into the mold, the outer surface of the sleeve 21' is cleaned with a suitable solvent and treated with a release agent to control the degree of adhesion of the outer urethane jacket. Release agents such as zinc sterate, fluorocarbon based releases or silicones such as RAM 225 by Ram Chemicals are suitable.

While the preferred recoverable sleeve assembly in accordance with the present invention includes end portions of the outer member extending beyond both ends of the inner member, an end extension of the outer member can be provided on only one end of the inner member or on neither of the ends.

FIGS. 17 and 18 illustrate the molding method for providing an assembly with an outer member extension on only one end. As illustrated there the expanded tubular member 21" is positioned on the mandrel 23 with one end of the tubular member all the way at the end of the larger diameter portion of the mandrel 32 leaving space between the opposite end of the tubular member 21" and the end of the hollow cavity 43 of the mold. When the urethane mixture is injected into the mold cavity an end portion of the outer member will project beyond only one end of the inner member. When the core member is removed from the mold, the recoverable sleeve assembly removed from the mandrel will appear as in FIG. 18.

I claim:

1. In a recoverable sleeve assembly including an inner elastomeric tube and an outer rigid tube surrounding and secured to the inner tube and holding the inner tube in outwardly stretched condition, the improvement comprising an outer tube extending axially beyond and covering both ends of the inner tube, secured to said ends of the inner tube, and having a thickness equal to the total thickness of the inner tube plus the thickness of that portion of the outer tube which surrounds the inner tube, said outer tube being a rigid thermosetting adhesive polyurethane comprising a polyol reacted with an isocyanate whereby said outer tube is sufficiently adhesive to hold the inner tube in outwardly stretched condition but will peel from the inner tube after breaking by impact or application of heat without use of a solvent.

2. In a recoverable sleeve assembly including an inner elastomeric tube and an outer rigid tube surrounding and secured to the inner tube and holding the inner tube in outwardly stretched position, the improvement comprising: an outer tube extending axially beyond and covering both ends of the inner tube, secured to said ends of the inner tube, and having a thickness equal to the total thickness of the inner tube plus the thickness of that portion of the outer tube which surrounds the inner tube, said outer tube comprising a rigid thermosetting adhesive polyurethane comprising substantially 101 parts of a mixture of trimethylolpropane branched glycol adipate, 1,4butanediol catalyst, antioxidant release agent and substantially 115 parts of a polymeric isocyanate.

3. In a recoverable sleeve assembly including an inner elastomeric tube and an outer rigid tube surrounding and secured to the inner tube and holding the inner tube in outwardly stretched position, the improvement comprising: an outer tube extending axially beyond and covering both ends of the inner tube, secured to said ends of the inner tube, and having a thickness equal to the total thickness of the inner tube plus the thickness of that portion of the outer tube which surrounds the inner tube, said outer tube comprising a rigid thermosetting adhesive polyurethane comprising substantially 100 parts of a mixture of polycaprolactone polyol and ¼ butanediol and substantially 100-115 parts polymeric isocyanate.

4. In a recoverable sleeve assembly including an inner elastomeric tube and an outer rigid tube surrounding and secured to the inner tube and holding the inner tube in outwardly stretched condition, the improvement comprising:

an outer tube comprising a rigid thermosetting adhesive polyurethane comprising a polyol reacted with an isocyanate whereby the outer tube is sufficiently adhesive to hold the inner tube in outwardly stretched condition but will peel from the inner tube after breaking by impact or application of heat without use of a solvent, said outer tube molded to said inner elastomeric tube with said inner elastomeric tube treated with a silicone based release agent, said outer tube extending axially beyond and covering both ends of the inner tube, secured to said ends of the inner tube, and having a thickness equal to the total thickness of the inner tube plus the thickness of that portion of the outer tube which surrounds the inner tube.

5. In a sleeve assembly of claim 4 the outer tube formed from a trimethylol propane branched glycol adipate polyol modified with 1,4 butanediol reacted with said isocyanate.

6. In a sleeve assembly of claim 4 the outer tube formed from a mixture of polycaprolactone polyol modified with 1,4 butanediol reacted with said isocyanate.

7. In a sleeve assembly of claim 4 an outer tube extending axially beyond and covering at least one end of the inner tube and secured to said one end of the inner tube.

8. In a sleeve assembly of claims 5 or 6 the ratio of the iocyanate to the polyol mixture being in the range of 1.05 to 1.10 equivants of isocyanate per equivalent weight of polyol.

* * * * *